United States Patent Office 2,794,718
Patented June 4, 1957

2,794,718

FUEL ANTIKNOCK

John D. Bartleson, Franklin, Mich., assignor to Ethyl Corporation, New York, N. Y., a corporation of Delaware No Drawing. Application August 13, 1953, Serial No. 374,151

10 Claims. (Cl. 44—69)

This invention relates to the improvements of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvanttage particularly during storage, handling and blending operations, namely their inherent instability. Thus, tetraethyllead and related compounds are susceptible of deterioration which is largely dependent upon the nature of the environment. For example, it has been found that organolead antiknock agents and antiknock fluids containing the same when in contact with certain metals such as copper and copper-containing alloys tend to deteriorate even in a reducing atmosphere. Such deterioration is postulated to result from an adverse catalytic activity exhibited by such metals. In other words, it is generally believed that copper and like metals act as self-perpetuating decomposition accelerators. Another condition enhancing the deterioration of such antiknock agents is contact with air. It is generally believed that atmospheric constituents notably oxygen and ozone, tend to oxidize one or more of the lead-to-carbon bonds with the formation of insoluble decomposition products. Under these conditions there contemporaneously occurs a color change in the dyestuff normally present in antiknock fluids such that the visual identification of the product frequently becomes difficult if not impossible. Organolead antiknock agents are likewise decomposed on exposure to strong light, particularly sunlight. In this case the decomposition is attributed to the catalytic decomposition of the organolead compounds by ultra-violet light. It is apparent, therefore, that the exposure of tetraethyllead and tetraethyllead-containing compositions to any or all of the above environments results in a number of operational difficulties including loss of antiknock effectiveness, the formation of sludge and other types of sediment and the like.

When organolead-containing compositions are utilized in internal combustion engines other difficulties are frequently encountered. For example, in spite of the high degree of efficiency of the normal scavenger complement in antiknock fluids, the accumulation of engine deposits in the engine cannot be entirely prevented. Such deposition is particularly prevalent when spark ignition engines are operated under conditions of low speed and light load such as encountered in metropolitan driving conditions. As a result of notable improvements in fuel antiknock quality which have been made in recent years, such deposits present but a few minor problems in low compression engines. However, because of the trend in the automotive industry of utilizing high compression engines in passenger cars and trucks, the accumulation of deposits results in a number of relatively serious problems including increased detonation, deposit-induced autoignition or wild ping, spark plug fouling, reduction in exhaust valve life, and the like.

Of the problems previously enumerated, those of wild ping, spark plug fouling and reduced exhaust valve life are of considerable concern to the automotive industry. This results from the fact that each time the lead concentration in the fuel is raised to coincide with increases in compression ratio to eliminate detonation the magnitude of one or more of these problems generally increases. As a result, there is a paramount need existing for a new and improved method for altering the physical and chemical characteristics of deposits and for modifying the combustion process such that the wellknown detrimental effects of the previously described deposit-induced engine phenomena can be markedly suppressed or be eliminated.

It is, therefore, an object of the present invention to provide adjuvants for organolead compounds. It is likewise an object of this invention to provide means of improving compositions containing organolead antiknock agents such as antiknock fluids and fuels. Similarly, the provision of improved organolead compositions is another object of this invention. A particular object of this invention is to provide improved tetraethyllead and tetraethyllead-containing antiknock fluids. An additional important object of this invention is to provide adjuvants which, when utilized in accordance with this invention, not only enhance the stability characteristics of organolead-containing compositions, but which result in the diminution of deposit induced engine problems of the type described hereinbefore. Other important objects of this invention will be apparent from the discussion hereinafter.

It has now been found that the above and other objects of this invention are attained by providing compositions of matter adapted for use as additives to fuel for spark fired internal combustion engines comprising an organolead antiknock agent and, in quantity sufficient to stabilize or improve said agent, a product obtained by reaction between a phosphorus sulfide and an olefinic hydrocarbon, that is, an alicyclic or cyclic hydrocarbon containing at least one carbon-to-carbon double bond. Such olefinic hydrocarbons are frequently referred to as olefins and cyclo-olefins. Of such compounds it is preferred to employ an olefinic hydrocarbon which contains at least 4 carbon atoms so as to obtain the maximum benefits arising from this invention.

Typical members of the above class of olefinic hydrocarbon reactants include such materials as ethylene, propylene, amylenes, hexylenes, octadecylenes, camphene, alpha and beta pinene, and the like up to and including high molecular weight polybutenes and the like. Other materials which can be utilized in the preparation of the reaction products used as organolead adjuvants in my invention are hydrocarbons containing a plurality of double bonds which can be isolated, as in the case of diallyl, squalene, and terpene hydrocarbons in general; conjugated for example, isoprene, dimethylbutadiene, and in general materials exemplified by the butadienes, hexadienes, and the like; and cumulative as illustrated by the remarkably stable cumulenes. Cyclohexene, cyclooctene, cyclopentadiene, cyclohexadiene, pinene, fenchene, and similar compounds are illustrative of cyclic reactants within the purview of this invention.

While the olefinic hydrocarbons described thus far containing at least one ethylenic linkage for the most part represent single chemical entities it is frequently preferred to utilize as the olefinic hydrocarbon reactant mixtures of such compounds, especially mixtures which are readily available as articles of commerce. For example, suitable reaction products are obtained by reacting a phosphorous sulfide with a material such as obtained by the pyrogenic decomposition or cracking of higher molecular weight hydrocarbons such as paraffin wax, the dehydration of alcohols, the dehydrohalogenation of halogenated paraffins, the polymerization of low molecular weight hydrocarbons, the averaging of hydrocarbons, the catalytic dehydrogenation of hydrocarbons, the reaction of carbon monoxide with hydrogen, and the like. For example, olefin polymers prepared by the polymerization of low molecular weight olefins by methods known to the art which possess molecular weights above about 100, but which preferably are in the range of about 100 to about 500 represent a preferred type of olefinic hydrocarbon which can be successfully utilized in preparing my organolead adjuvants. One such material is Indopol L–50, which has an average molecular weight of about 420 and thus is, a polymer containing about 30 carbon atoms per molecule. This polymer is of the character obtained by polymerizing mixed butylenes by known methods. In some instances higher molecular weight polymers of this type, that is polymers having molecular weights up to about 3,000 or higher can be used.

The phosphorus sulfide, the other prime reactant utilized in the preparation of the organolead adjuvants of this invention is preferably a reactive compound such as $P_2S_5(P_4S_{10})$ and $P_4S_7$. It is possible, however, to use certain of the other reported phosphorus sulfides under the proper reaction conditions. Likewise, under suitable conditions the various sulfides of arsenic or antimony can be similarly employed in forming organolead adjuvants for use in the present invention.

The organolead adjuvants of this invention are readily prepared, the reaction generally requiring only the addition of a reactive phosphorus sulfide to the olefinic hydrocarbon and heating the mixture at a temperature at which the reaction takes place as evidenced by the release of hydrogen sulfide until the reaction is substantially complete. The temperature of the reaction is largely dependent upon the nature of the individual reactants although generally speaking temperatures in the order of about 200° to about 450° F. are satisfactory. In preparing some of the organolead adjuvants of this invention advantages are to be obtained by conducting the reaction under superatmospheric pressure which can be readily obtained by conducting the reaction in a closed vessel thereby taking advantage of the pressure resulting from the hydrogen sulfide so formed.

In forming the reaction products of the organolead adjuvants of this invention, from 0.2 to about 2.0 moles of the phosphorus sulfide are used per mole of an olefinic hydrocarbon, although it is generally preferred to use from 0.25 to about 0.75 mole of the sulfide.

The reaction products or adjuvants of this invention can be made in the presence of a diluent, if desired, which may or may not be subsequently removed. Such diluents are illustrated by such substances as kerosene, straight run and catalytically cracked hydrocarbons of the diesel fuel boiling range, light, intermediate or heavy lubricating oil fractions and the like.

The reaction products used as organolead adjuvants in accordance with this invention defy precise chemical definition. For example, in a recent publication (J. Am. Chem. Soc. 74, 4933 (1952)), disclosing the reaction between cyclohexene and $P_2S_5$ in a mole ratio of 4 to 1, it is stated "Attempts to isolate individual products from it were unsuccessful." Nevertheless, it is generally believed that such reaction products contain a substantial proportion of material containing the characteristic chemical bonding, $[(S=)_2P—C]_2$ which presumably results by reaction between the active hydrogen alpha to the double bond and the phosphorus sulfide. Thus, it would appear that a considerable proportion of the reaction product consists of a thioacid anhydride material. It may well be that with certain pure starting materials substantially pure reaction products are obtainable. However, an advantage inherent in this invention is the fact that it is not necessary to prepare substantially pure materials and further that it is generally preferred for economic reasons to utilize the reaction product in toto as an organolead adjuvant.

The organolead antiknock agent utilized in the compositions of matter of the present invention consists of an organolead compound in which lead is directly bonded to carbon atoms. Such compounds are exemplified by the lead aryls such as tetraphenyllead, and the lead alkyl such as tetramethyllead, tetraethyllead, tetrapropyllead, tetrabutyllead, dimethyldiethyllead, methyltriethyllead, and the like as well as mixtures of such compounds. Because of the generally superior characteristics of tetraethyllead and the ready accessibility thereof as an article of commerce, it constitutes a preferred embodiment of the organolead antiknock agent utilized in accordance with the instant invention.

With the various compositions within the scope of this invention the proportion of the reaction product obtained by the interaction of an olefinic hydrocarbon and a phosphorus sulfide utilized in conjunction with an organolead compound is such that there is a total of from between about 0.02 to about 0.80 theory of phosphorus. In this regard, a theory of phosphorus is defined as the amount of phosphorus theoretically required to react with the lead to form lead orthophosphate, which quantity is two atoms of phosphorus per three atoms of lead. However, generally speaking, it is sufficient to employ an amount of organolead adjuvant of this invention such that there is an amount of phosphorus between about 0.05 and about 0.5 theory of phosphorus with the best overall results being obtained with amounts of about 0.1 to about 0.2 theory of phosphorus, the last mentioned concentrations constituting a preferred embodiment.

Regarding many of the problems frequently associated with high octane quality fuel, an anomalous situation obtains. On one hand, an effective adjuvant for organolead compounds should possess stability against deterioration in common environments, compatibility with the chemical entities with which it comes in contact, and volatility so as to possess the characteristic frequently referred to as engine inductibility. On the other hand, the mere selection of a phosphorus compound to acquire the optimum characteristics enumerated above does not necessarily assure the effectiveness of the compound in combatting such phenomena as spark plug fouling, wild ping and the like. It is entirely proble that some empirical relationship between physical properties and effectiveness in the obviation of such problems exists, but as yet the state of the art does not contain a satisfactory relationship of this type. However, the phosphorus materials within the purview of this invention, for the most part, possess the requisite physical properties adapting them for use as organolead adjuvants and at the same time are effective in obviating engine problems of the type described hereinbefore.

It will be apparent that there exists a number of variations in employing the adjuvants of this invention. For example, a facet of this invention involves the provision of a mixture of an organolead antiknock agent such as a lead alkyl and an olefinic hydrocarbon-phosphorus sulfide reaction product of the type described above. In such a case, the resulting composition can be blended with hydrocarbon fuel of the gasoline boiling range to provide an improved fuel composition which under certain circumstances does not require the utilization of organic halogen-containing material as a scavenger. It is believed that under these conditions the presence of a quantity of phosphorus as above described and chemically bonded in accordance with the requirements of the olefinic hydrocarbon-phosphorus sulfide reaction product used in this invention contributes sufficient scavenging action such that the amount of deposition in the engine is suitably controlled, notwithstanding the fact that lead phosphates generally have high melting points. Likewise, in this embodiment of the instant invention the general storage characteristics of organolead compounds are frequently enhanced.

Of perhaps more practical importance is a second variant of this invention, namely the utilization of the aforesaid olefinic hydrocarbon-phosphorus sulfide reaction product in organolead containing antiknock fluids. It is wellknown in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion such antiknock fluids likewise contain minor proportions of diluents, antioxidants, metal deactivators, and the like. In line with the foregoing, therefore, a preferred embodiment of this invention involves providing improved antiknock fluids containing the requisite concentration of the above described olefinic hydrocarbon-phosphorus sulfide reaction product. Such improved antiknock fluids frequently do not require the presence of a solubilizing agent or a stabilizer since the phosphorus compound itself is generally sufficiently miscible with the constituents of the antiknock fluid and imparts thereto a degree of stabilization. However, under some conditions additional benefits are to be derived by employing in the improved antiknock fluids of this invention the necessary quantities of such materials.

Still another variant of the present invention consists of providing improved fuel compositions. These normally consist of hydrocarbons of the gasoline boiling range containing a minor proportion of the aforesaid antiknock fluids of the present invention. It will be appreciated that the quantity of the antiknock fluid of the present invention utilized in my improved fuel compositions is primarily contingent upon the use for which the gasoline is intended. That is to say, when the fuel is intended for use in automotive engines such as passenger cars, trucks, buses and the like, an amount of any of my improved antiknock fluids equivalent to a lead content in the gasoline of from between about 0.53 and about 3.17 grams of lead per gallon is satisfactory. Thus, in the embodiment of this invention wherein I employ tetraethyllead as an antiknock agent such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of the present invention are utilized in fuel for aviation engines somewhat higher concentrations are employed. Generally speaking, amounts of lead up to about 6.34 grams of lead per gallon can be utilized although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated hereinabove, in all of the compositions of the present invention the amount of phosphorus is fixed within the limits above-described. Thus, in the preferred fuel embodiments of my invention there is present an amount of phosphorus as an olefinic hydrocarbon-phosphorus sulfide reaction product such that there is from about 0.1 to 0.2 theory of phosphorus. In preparing the improved fuel compositions of this invention it is usually necessary only to add the requisite quantity of the improved fluid to the fuel and by means of stirring, shaking or other means of physical agitation homogeneous fuel compositions are provided. Although the simplest means of preparing such fuels is to blend therewith the necessary quantity of an improved antiknock fluid of this invention, it is possible to add a conventional antiknock fluid to the fuel and subsequently blend therewith the necessary quantity of the olefinic hydrocarbon-phosphorus sulfide reaction product. In addition to reversing this order of addition of conventional antiknock fluids and olefinic hydrocarbon-phosphorus sulfide reaction products another variant within the purview of this invention is to blend with the fuel each of the individual constituents of my antiknock fluids separately.

The following specific examples wherein all parts and percentages are by weight are illustrative of the methods which can be employed in preparing the organolead adjuvants of this invention.

Example I

To a suitable glass reaction vessel equipped with an electric heating mantle and a stirrer was added 3020 parts (7.2 moles) of Indopol L–50 and 666 parts (3.0 moles) of phosphorus pentasulfide ($P_2S_5$). The temperature of the vessel was then raised to a temperature of 400° F. for a period of four hours while continuously stirring the reaction mixture. During this reaction period the gas evolved was allowed to escape from the reaction vessel so that the reactants were maintained at substantially atmospheric pressure. At the end of the reaction a clear product remained in the vessel. It was found that a 96 percent yield was obtained based on the olefinic hydrocarbon used.

Example II

In a suitable reaction vessel are placed 38 parts of $P_2S_5$ and 62 parts of reduced motor polymer, an olefinic polymer having an average molecular weight of 140, prepared from a mixture of $C_3$ and $C_4$ olefins by polymerization in the presence of a phosphoric acid catalyst. The temperature of the reactants is then raised to about 350° F. for a period of about two hours while continuously agitating the reactants. At the end of this time the evolution of gas has substantially ceased and although a clear reaction product is formed, it is preferred to filter and extract it with normal pentane. A yield of about 95 percent of reaction product is obtained, based on the motor polymer.

Example III

To a pressure reaction vessel is added 38 parts of $P_2S_5$ and 62 parts of reduced motor polymer. The temperature is raised to 350° F. for about two hours with continuous stirring. During this period it is preferable to vent some of the gas formed so that the pressure will not be substantially in excess of about 100 pounds per square inch. At the end of the reaction period it is preferable to filter the reaction product although it is essentially sludge-free. It is found that a 100 percent yield is obtained based on the motor polymer.

As indicated by the above examples, it is possible to prepare the adjuvants of this invention with or without the use of superatmospheric pressure. Still an additional variant which can be used in preparing the olefinic hydrocarbon-phosphorus sulfide reaction products consists of reacting under pressure the starting materials in the presence of a small but somewhat critical amount of water. Such a method is illustrated by Example IV.

Example IV

In a pressure reaction vessel is placed 38 parts of $P_2S_5$, 62 parts of reduced motor polymer and 4 parts of water.

The temperature of this mixture is then raised to 350° F. at which temperature it is maintained for a period of two hours with continuous stirring. It is preferable to employ a pressure of about 100 pounds per square inch which can be regulated by periodically venting the reaction vessel. It is found that a homogeneous reaction product is obtained which contains about 24.6 percent of sulfur and about 8.9 percent of phosphorus.

The reactants and reaction conditions described in the previous specific examples are merely illustrative. For example, by utilizing the above and similar reaction conditions it is possible to prepare suitable adjuvants of this invention by reacting a phosphorus sulfide such as $P_2S_5$, $P_4S_7$ and the like with such olefinic hydrocarbons as a material obtained by thermally cracking paraffin wax, a 500 molecular weight polypropylene, alpha pinene, n-hexadecene, a 2000 molecular weight polybutene and the like.

To illustrate the effectiveness of the improved antiknock fluids of the present invention consideration was given to the problem of spark plug fouling. In order to do this, recourse was made to the following general test procedure utilizing a standard modern V-8 engine equipped with overhead valves having a 3¾″ bore, a 3 7/16″ stroke, a 303.7 cubic inch displacement and a compression ratio of 7.25 to one equipped with commercially available spark plugs. In order to establish a base line this engine is operated in conjunction with an engine dynamometer on a standard commercial fuel containing 3 milliliters of tetraethyllead per gallon as conventional antiknock fluid containing 0.5 theory of bromine as ethylene dibromide and 1.0 theory of chlorine as ethylene dichloride. This engine is operated under a durability schedule used for spark plug deposit accumulation patterned after road conditions experienced in city driving which are known to produce spark plug fouling of the greatest magnitude. Such operation is substantially continuous until a number of spark plug failures is detected thereby establishing a quantitative measure of the degree of spark plug fouling which can be expressed in average hours to plug failure. The engine is then freed from deposits and equipped with new spark plugs. The same procedure was repeated using the same fuel base stock to which was added an improved antiknock fluid of the present invention.

By way of example, when 300 gallons of a petroleum hydrocarbon fuel available as an article of commerce was treated with 900 milliliters of tetraethyllead in a fluid containing tetraethyllead, 0.5 theory of bromine as ethylene dibromide and 1.0 theory of chlorine as ethylene dichloride, a suitable fuel was prepared for establishing a base line of hours to spark plug failure. When the standard V-8 engine described hereinbefore was operated on this homogeneous fuel composition it was found that in an average time of about 34 hours 3 spark plug failures had occurred.

In contrast, when a suitable quantity of the same fuel base stock to which had been added a conventional antiknock fluid was treated with an organolead adjuvant of the present invention greatly enhanced spark plug life was obtained. The following example more specifically illustrates.

Example V

To 1,000 gallons of a commercially available hydrocarbon fuel base stock was added 3 liters of tetraethyllead as a fluid comprising tetraethyllead, 0.5 theory of bromine as ethylene dibromide, and 1.0 theory of chlorine as ethylene dichloride. To the resulting homogeneous mixture was added 0.1 theory of phosphorus as the product obtained by reaction between Indopol L-50 and phosphorus pentasulfide as prepared by the methods shown in Example I. Upon intimately mixing these components the homogeneous fuel composition containing 3.0 milliliters of tetraethyllead per gallon was subjected to the above-described engine test procedure. It was found that the average time for the occurrence of three spark plug failures was 100 hours. Thus, the utilization of an organolead adjuvant of this invention resulted in an improvement in spark plug life amounting to 294 percent of the base line.

Comparable effectiveness regarding the suppression of spark plug fouling is obtained when other improved compositions of this invention are utilized. For example, when such adjuvants as those formed by reaction between a phosphorous sulfide and such olefinic hydrocarbons as 140 molecular weight polymer from mixtures of propylene and butylenes, beta pinene, dicyclopentadiene, n-dodecene are used significant reduction in spark plug fouling is obtained. Without desiring to be bound by the following explanation regarding the enhanced effectiveness of the adjuvants of this invention, a tenable explanation apparently involves a proper balance between physical properties such as stability, volatility, solubility, compatibility and the like and the energy relationships or ease of decomposition which may attribute to the overall effectiveness of my adjuvants by facilitating decomposition at the proper instant in the engine cycle.

To still further illustrate the enhanced effectiveness of the organolead-containing compositions of the present invention, consideration was given to the problem of wild ping. To demonstrate the effectiveness of my compositions in this regard, I subject both a hydrocarbon fuel treated in accordance with this invention and another portion of the same hydrocarbon fuel treated with a conventional antiknock mixture to a test procedure involving the use of a single-cylinder CFR knock test engine equipped with an L-head cylinder and a wild ping counter which records the total number of wild pings which have occurred during the test periods. Such apparatus includes an extra spark plug used as an ionization gap which is installed in a second opening in the combustion chamber. A mechanical breaker switch driven at camshaft speed is also provided which, when closed, makes the wild ping counter ineffective for the duration of the normal flame in the combustion chamber. The breaker is open for 80 crankshaft degrees between 70° BTC (before top dead center) and 10° ATC (after top dead center). If a flame front induced early in the cycle by deposits reaches the ionization gap during this open period, the counter registers a wild ping regardless of the audible manifestations. During normal combustion with ignition timing at TDC (top dead center) the flame front reaches the ionization gap at 15 to 18° ATC during the period wherein the points are closed and no count is made. The actual test procedure consists essentially of operating the test engine initially having a clean combustion chamber under relatively mild cycling conditions for deposit formation until an equilibrium with regard to deposit induced autoignition is reached. The effect of fuels treated in accordance with the instant invention is determined by comparing the test results obtained using the fuel treated with an olefinic hydrocarbon-phosphorus sulfide reaction product with those obtained using a fuel treated with a conventional antiknock mixture. Since the wild ping counter records the total number of wild pings which have occurred during the test procedures a quantitative expression for the amount of deposit-induced autoignition is the number of wild pings per hour of operation. The effectiveness of my improved fuel compositions in virtually eliminating deposit induced autoignition is illustrated by the following specific examples.

Example VI

To 50 gallons of a commercially available blend of straight run, catalytically cracked and polymer blending stocks was added 150 milliliters of tetraethyllead as an antiknock fluid comprising tetraethyllead, 0.5 theory of bromine as ethylene dibromide, and 1.0 theory of chlorine as ethylene dichloride. Upon mechanically agitating this mixture a homogeneous fuel composition was obtained. When this fuel was utilized in the above-described engine test procedure it was found that there were 135 wild pings per hour of engine operation.

*Example VII*

To 100 gallons of the same base stock was added 300 milliliters of tetraethyllead as the same antiknock fluid described in the previous example. To this mixture was added 0.1 theory of phosphorous as the product obtained by reaction between phosphorous pentasulfide and Indopol L-50 prepared in accordance with the method described in Example I. The resulting fuel was then mechanically agitated so as to provide a homogeneous improved fuel composition of the present invention. When this fuel was introduced into the test engine it was found that there were 37 wild pings per hour of engine operation. Therefore, the utilization of an improved fuel composition of the present invention resulted in a reduction of the rate of wild ping amounting to about 72 percent.

The superior effectiveness of the adjuvants of this invention in the abatement of deposit-induced engine problems is totally unexpected when considering the constituents which make up their chemical structure. On the one hand, both sulfur and phosphorus compounds have heretofore been judiciously avoided as much as possible in fuel because of their notorious deleterious effects particularly in the realm of organolead antagonism and the like. In the case of sulfur, for example, refiners have long been resorting to various means of removing sulfur from hydrocarbons of the gasoline boiling range because of its recognized deleterious effects on antiknock activity, engine cleanliness, storage stability and the like. However, the adjuvant of this invention possessing both phosphorus and sulfur does not bring about such deleterious effects. On the other hand, another surprising effect has been noted, namely the fact that the presence of phosphorus-to-sulfur bonds produces a greater effectiveness regarding wild ping than that exhibited by compounds possessing either phosphorus or sulfur and likewise a mixture of phosphorus- and sulfur-containing compounds. That fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of 1 theory of ditertiary butyl disulfide, 2 theories of dibutyl sulfide, and 2 theories of thiophene, a mixture representative of the average sulfur constituents of petroleum hydrocarbon fuel, to a conventional gasoline containing 3 milliliters of tetraethyllead per gallon resulted in a wild ping rate of 93 wild pings per hour. In contrast, the same base fuel containing the same concentration of tetraethyllead produced 74 wild pings per hour. Thus the incorporation of sulfur-containing compounds different from the sulfur-containing adjuvant utilized in the present invention resulted in a wild ping rate amounting to 125 percent of the base line. That is to say, the presence of sulfur-containing compounds generally increases the rate of wild ping whereas the presence of a considerable amount of sulfur when suitably bonded in accordance with the preferred embodiment of the present invention results in a definite improvement in this deposit-induced phenomenon. In view of the foregoing, therefore, the apparent conclusion to be reached is that the chemical bonds between the two prime elements making up the preferred adjuvants of this invention in some currently unexplainable manner produce enhanced effectiveness with regard to deposit-induced engine phenomena without resulting in secondary deleterious problems normally attributed to the presence of each of the elements when used separately or as mixtures of individual phosphorus and sulfur-containing compounds.

An additional important advantage obtained from practicing the instant invention is the fact that my organolead adjuvants have little or no antagonistic effect upon the antiknock agent used in the fuel. In line with the enhanced effectiveness of my organolead adjuvants, this surprising benefit regarding a minimum of organolead destructiveness is perhaps associated with the degree of oxidative stability inherent in olefinic hydrocarbon-phosphorus sulfide reaction products. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compounds exerts its beneficial antiknock activity.

Because of their adaptability, the adjuvants of the present invention can be successfully utilized with any of the well known organolead antiknock agents as indicated hereinbefore. Likewise, insofar as the halide scavengers are concerned, olefinic hydrocarbon-phosphorus sulfide reaction products can be employed in antiknock fluids and fuels containing such materials as ethylene dibromide, ethylene dichloride, mixed dibromotoluenes, trichlorobenzenes, and in general such organic halide scavengers as those disclosed in U. S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other motor fuel additives such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An antiknock additive for use in hydrocarbon fuels of the gasoline boiling range, said additive comprising an organolead anti-knock agent and a product obtained by reaction between (1) an olefinic hydrocarbon containing at least 4 carbon atoms in the molecule and having a molecular weight of up to about 3000 and (2) a phosphorus sulfide selected from the group consisting of $P_2S_5$ and $P_4S_7$, said reaction comprising heating from 0.2 to about 2.0 moles of said sulfide per mole of said olefinic hydrocarbon to a temperature at which hydrogen sulfide is released, said product being present in said additive in amount such that the phosphorus-to-lead atom ratio is from about 0.04/3 to about 1.6/3.

2. The additive of claim 1 further characterized in that the anti-knock agent is a lead alkyl.

3. The additive of claim 1 further characterized in that the anti-knock agent is tetraethyllead.

4. An antiknock additive for use in hydrocarbon fuels of the gasoline boiling range, said additive consisting essentially of tetraethyllead, a scavenging amount of organic halide material capable of reacting with the lead during combustion in a spark ignition internal combustion engine to form volatile lead halide, said material containing only elements selected from the group consisting of bromine, chlorine, carbon, hydrogen and oxygen; and a product obtained by reaction between (1) an olefin hydrocarbon polymer having a molecular weight from about 100 to about 500 and (2) a phosphorus sulfide selected from the group consisting of $P_2S_5$ and $P_4S_7$, said reaction comprising heating from 0.2 to about 2.0 moles of said sulfide per mole of said polymer to a temperature at which hydrogen sulfide is released, said product being present in said additive in amount such that the phosphorus-to-lead atom ratio is from about 0.04/3 to about 1.6/3.

5. The additive of claim 4 further characterized in that said scavenging amount of organic halide material is about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

6. Hydrocarbon fuel of the gasoline boiling range adapted for use as fuel for spark ignition internal combustion engines containing from about 0.53 to about 6.34 grams of lead per gallon as an organolead antiknock agent, and a product obtained by reaction between (1) an olefinic hydrocarbon containing at least 4 carbon atoms in the molecule and having a molecular weight of up to about 3000 and (2) a phosphorus sulfide selected from the group consisting of $P_2S_5$ and $P_4S_7$, said reaction comprising heating from about 0.2 to about 2.0 moles of said sulfide per mole of said olefinic hydrocarbon to a temperature at which hydrogen sulfide is released, said product being present in said fuel in amount such that the phosphorus to lead atom ratio is from about 0.2/3 to about 1.6/3.

7. The hydrocarbon fuel composition of claim 6 further characterized in that it contains a scavenging amount of organic halide material capable of reacting with the lead during combustion in a spark ignition internal combustion engine to form volatile lead halide, said material containing only elements selected from the group consisting of bromine, chlorine, carbon, hydrogen and oxygen.

8. Hydrocarbon fuel of the gasoline boiling range adapted for use as fuel for spark ignition internal combustion engines containing from about 0.53 to about 4.75 grams of lead per gallon as tetraethyllead, about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with lead during combustion in a spark ignition internal combustion engine to form volatile lead chloride; and a product obtained by reaction between (1) an olefin hydrocarbon polymer having a molecular weight from about 100 to about 500 and (2) a phosphorus sulfide selected from the group consisting of $P_2S_5$ and $P_4S_7$, said reaction comprising heating from 0.2 to about 2.0 moles of said sulfide per mole of said polymer to a temperature at which hydrogen sulfide is released, said product being present in said fuel in amount such that the phosphorus-to-lead atom ratio is from about 0.2/3 to about 1.6/3.

9. The composition of claim 8 wherein said product is obtained by reaction between reduced motor polymer and $P_2S_5$.

10. The composition of claim 8 wherein said product is obtained by reaction between a polybutene having an average molecular weight of about 420 and $P_2S_5$.

References Cited in the file of this patent

UNITED STATES PATENTS

| | | |
|---|---|---|
| 2,378,793 | Rudel | June 19, 1945 |
| 2,398,281 | Bartholomew | Apr. 9, 1946 |
| 2,405,560 | Campbell | Aug. 13, 1946 |
| 2,534,217 | Bartleson | Dec. 19, 1950 |
| 2,712,528 | Hill et al. | July 5, 1955 |

FOREIGN PATENTS

| | | |
|---|---|---|
| 683,405 | Great Britain | Nov. 26, 1952 |